United States Patent
Yang

(10) Patent No.: US 7,428,646 B2
(45) Date of Patent: Sep. 23, 2008

(54) WIRELESS CONTROL SYSTEM AND METHOD THEREOF

(75) Inventor: Ching-Hwa Yang, Taipei Shien (TW)

(73) Assignee: Quanta Computer, Inc., Tao Yuan Shien (TW)

( * ) Notice: Subject to any disclaimer, the term of this patent is extended or adjusted under 35 U.S.C. 154(b) by 372 days.

(21) Appl. No.: 11/167,103

(22) Filed: Jun. 28, 2005

(65) Prior Publication Data

US 2006/0248357 A1    Nov. 2, 2006

(30) Foreign Application Priority Data

Apr. 29, 2005    (TW) .............................. 94114013 A

(51) Int. Cl.
G06F 1/00    (2006.01)
G06F 1/26    (2006.01)

(52) U.S. Cl. .................. 713/300; 713/320; 713/323

(58) Field of Classification Search ................ 713/300, 713/320, 324, 330
See application file for complete search history.

(56) References Cited

U.S. PATENT DOCUMENTS

| | | | |
|---|---|---|---|
| 2003/0188172 A1* | 10/2003 | Yeh | 713/189 |
| 2003/0233591 A1* | 12/2003 | Chiteboun et al. | 713/300 |
| 2004/0046677 A1* | 3/2004 | Dresti et al. | 340/825.57 |
| 2004/0106431 A1* | 6/2004 | Laroia et al. | 455/552.1 |
| 2004/0196142 A1* | 10/2004 | Berg | 340/7.1 |
| 2005/0009496 A1* | 1/2005 | Chen | 455/334 |
| 2005/0035950 A1* | 2/2005 | Daniels | 345/169 |

FOREIGN PATENT DOCUMENTS

CN    1400534    3/2003

* cited by examiner

Primary Examiner—Suresh K Suryawanshi
(74) Attorney, Agent, or Firm—Rabin & Berdo, P.C.

(57) ABSTRACT

A wireless control system for a computer with a processing system includes a power supply, a microprocessor, a wireless control portion and a signal transceiver. The power supply converts an external power into a power for the computer. The microprocessor connects the power supply to control the power supply. The wireless control portion includes a plurality of operation keys to generate different signals and a power source to supply the wireless control portion. The signal transceiver connects to the microprocessor and the processing system. The signal transceiver receives and decodes the signals from the wireless operation portion, and transmits the decoded signals to the microprocessor and the processing system. The wireless control portion triggers the microprocessor to determine whether the power supply provides the power for the processing system.

12 Claims, 3 Drawing Sheets

WIRELESS CONTROL SYSTEM AND METHOD THEREOF

RELATED APPLICATIONS

The present application is based on, and claims priority from, Taiwan Application Ser. No. 94114013, filed Apr. 29, 2005, the disclosure of which is hereby incorporated by reference herein in its entirety.

BACKGROUND OF THE INVENTION

1. Field of Invention

The invention relates to a wireless control system and, in particular, to a wireless control system that controls the on and off states of a processing system or the actions of a multimedia device and the signal inputs.

2. Related Art

When using a conventional computer, the user usually uses the switch on the machine to start the computer. After the computer starts, the user uses such operating devices as the keyboard and mouse connected to the host machine to input signals for controlling the computer. However, due to the connecting wires between the operating devices and the host machine, it is likely to make people feel disorder in space usage.

In view of this, wireless keyboards and mice have been introduced. Nevertheless, the signals between the conventional wireless operating devices and the host are limited to the signals entered by the user while the computer is on. If the computer is off, the wireless operating devices have no actions at all. The user still has to use the switch on the machine to turn on the computer. Suppose the switch on the computer is not within easy reach of the user. He or she may have to move the body and the wireless devices away in order to operate the switch. This is very inconvenient.

Moreover, some of the conventional keyboards are equipped with a Power key, a Sleep key, and a Wake Up key. The Power key is designed for the user to turn on or off the power of the computer. To turn on the power, the user still has to use the switch on the host machine. The Sleep key enables the computer to stay in a standby state with low power consumption. The Wake Up key returns the computer to its state before standby. When the computer is in the standby state, the processing system still wastes power and does not stop at all.

Besides, when using a computer with multimedia devices (e.g., a channel selector, a media recording/playing device, a monitoring device, etc), one has to select an appropriate application program to turn on the functions of the multimedia device while the computer is on. Nonetheless, this is rather difficult for beginning users. Moreover, the processing system in the computer consumes more power. It is thus very uneconomic to turn on the computer if all one wants is to listen to the radio.

SUMMARY OF THE INVENTION

Therefore, an object of the invention is to provide a wireless control system. The user can turn on and off the processing system by operating the wireless control portion of the invention.

Another object of the invention is to provide a wireless control system so that the user can use the wireless control portion to start the functions of multimedia devices without starting the processing system.

To achieve the above objects, the disclosed wireless control system for a computer with a processing system includes: a power supply, a microprocessor, a wireless control portion and a signal transceiver. The power supply converts an external power into a power for the computer. The microprocessor connects to the power supply to control the power supply. The wireless control portion includes a plurality of operation keys to generate different signals and a power source to supply the wireless control portion. The signal transceiver connects to the microprocessor and the processing system. The signal transceiver receives and decodes the signals from the wireless operation portion, and transmits the decoded signals to the microprocessor and the processing system. When the wireless control portion sends out a signal to shut down the processing system, the signal transceiver receives the signal and decodes it. The microprocessor detects the decoded signal, controlling the power supply to stop supplying power to the processing system. When the wireless control portion sends out a signal to restart the processing system, the signal transceiver receives the signal and decodes. The microprocessor detects the decoded signal, controlling the power supply to start supplying power to the processing system.

The power supply includes a main switch to control the on and off of the external power. The wireless control portion includes a wireless keyboard, a wireless mouse, and a wireless drawing board. The signals between the wireless control portion and the signal transceiver include the electromagnetic (EM) signal, infrared (IR) signal, and ultrasonic signal. The power of the wireless control portion includes a reusable power source. The wireless control portion includes a charger for charging the reusable power source or as the power supply of the wireless control portion.

The wireless control system further includes a multimedia device coupling to the microprocessor that sends the input signal of the wireless control portion to the multimedia device. The multimedia device is also coupled to the processing system for sending the data read by the multimedia to the processing system. The multimedia devices include the channel selector, the media recording/playing device, and the monitoring device.

The power supply contains two different power supplies. One of them supplies power to the processing system, while the other supplies power to circuits other than the processing system.

The invention provides a signal identification method. It includes the steps of: generating a base time-ordered pulse with a fixed frequency; comparing a plurality of pulse signals with the width between the high and low of the base time-ordered pulse; and identifying the difference among the pulse signals according to the ratio of the width of the pulse signals and the width between the high and low of the base time-ordered pulse.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE PREFERRED EMBODIMENT

The present invention will be apparent from the following detailed description, which proceeds with reference to the accompanying drawings, wherein the same references relate to the same elements.

Figure 1:
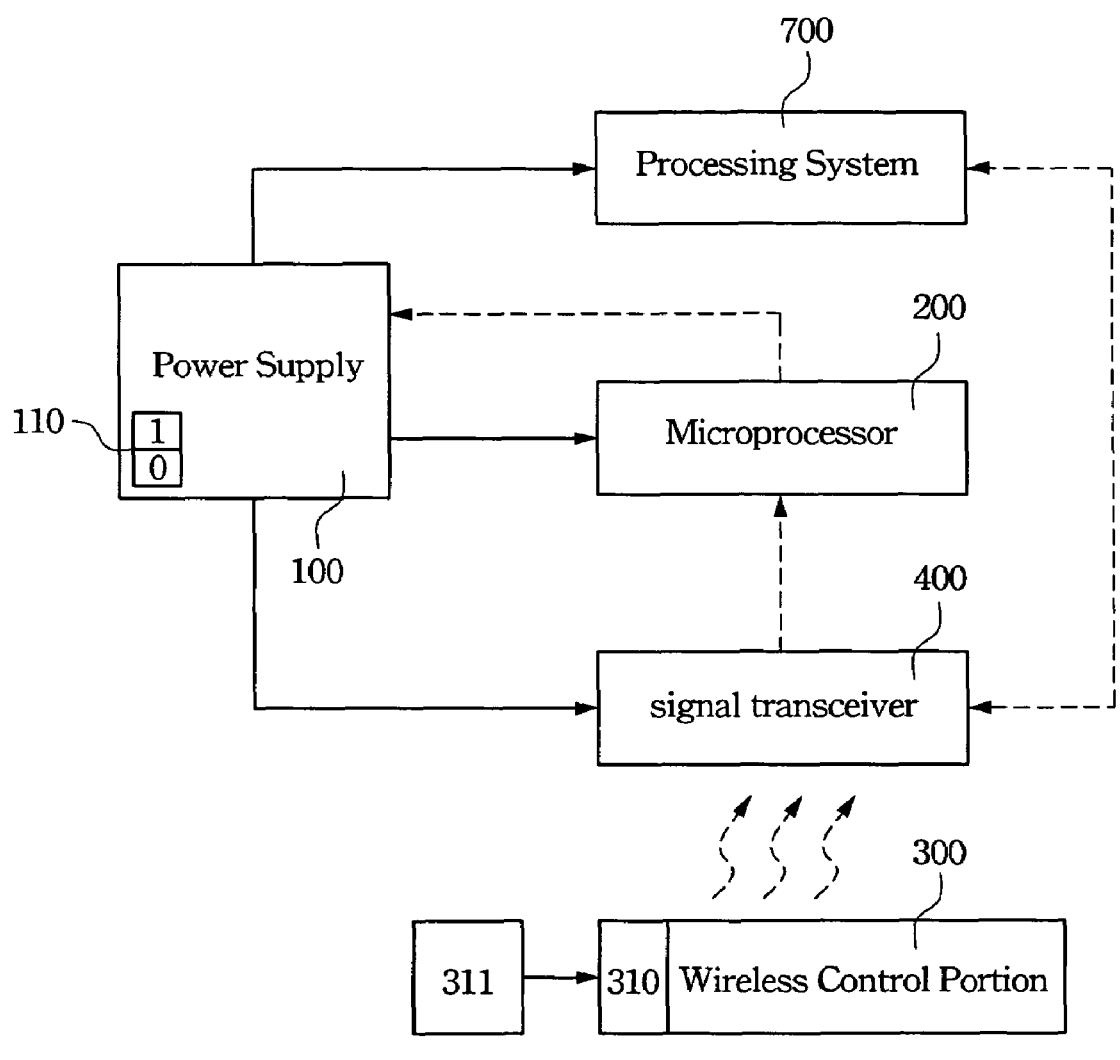
FIG. 1 is a system block diagram for an embodiment of the invention.

As shown in FIG. 1, the disclosed wireless control system is used in a computer that contains a processing system 700. The wireless control system includes a power supply 100, a microprocessor 200, a wireless control portion 300, and a signal transceiver 400.

The power supply 100 converts an external power into the power needed by the computer, and supplies it to the microprocessor 200, the signal transceiver 400, and the processing system 700. The power supply 100 includes a main switch 110 to control the on and off states of the external power. The microprocessor 200 is coupled to the power supply 100 for transmitting a signal to control the power supply 100. The wireless control portion 300 includes several operation keys, each of which generates a distinct signal. The wireless control portion 300 also includes a power source 310 and a charger 311. The power source 310 provides the working power for the wireless control portion 300 and includes a reusable power source. The charger 311 charges the reusable power source 310 or functions as the power supply of the wireless control portion 300. The wireless control portion 300 includes a wireless keyboard, a wireless mouse, and a wireless drawing board. Electromagnetic (EM) signals, infrared (IR) signals, and ultrasonic signals are used for communications between signal transceiver 400 and the wireless control portion 300. The transceiver 400 is coupled to both the microprocessor 200 and the processing system 700. The signal transceiver 400 receives the signal form the wireless control portion 300 and decodes the different signals generated by the wireless control portion 300. After decoding, the signal transceiver 400 sends the signal to the microprocessor 200 and the processing system 700.

When using a computer, one first turns on the main switch 110 for supplying the external power to the power supply 100. The power supply 100 can be set to automatically supply power to the microprocessor 200, the signal transceiver 400, and the processing system 700. The computer then starts. Alternatively, one uses the signal of another operation key to start the computer. After the computer is turned on, the user uses the wireless control portion 300 to enter a signal. The signal transceiver 400 receives the signal from the wireless control portion 300 and decodes it. The decoded signal is sent to the processing system 700, which then outputs the processing result according to the input signal from the user.

To stop using the computer, one uses the wireless control portion 300 to send out a signal for stopping the processing system 700. Once the signal transceiver 400 receives the signal, it immediately sends out a corresponding signal to the microprocessor 200. The microprocessor 200 identifies the signal for stopping the processing system 700 and transmits a signal to the power supply 100. The signal stops the power supply to the processing system 700, thereby turning off the processing system 700.

After the processing system 700 stops action, it cannot receive the signal from the wireless control portion 300 transmitted by the signal transceiver 400. The power supply 100 continues supplying power to the circuits other than the processing system 700, such as the microprocessor 200 and the signal transceiver 400.

To restart the computer, one uses the wireless control portion 300 to send out a signal for starting the processing system 700. After the signal transceiver 400 decodes the signal from the wireless control portion 300, it transmits the decoded signal to the microprocessor 200. After identifying the signal, the microprocessor 200 transmits a signal to the power supply 100, and the power supply 100 supplies power to the processing system 700 again. This then restarts the processing system 700 for the user.

In comparison with the computer's standby state in the prior art, the invention uses the wireless control system to turn on and off the processing system 700 so that the energy is consumed in a more economic way. A power of the present invention is lower than the prior art for maintaining the processing system 700 in the standby state, which is used to main the actions of the microprocessor 200 and the signal transceiver 400. The processing system 700 can be restarted by simply operating the wireless control portion 300.

When turning off the main switch 110, the external power is cut and the power supply 100 cannot supply power. The computer stops functioning. To restart the computer, the main switch 110 has to be turned on again. This can be done by repeating the above-mentioned steps for using the computer.

Figure 2:
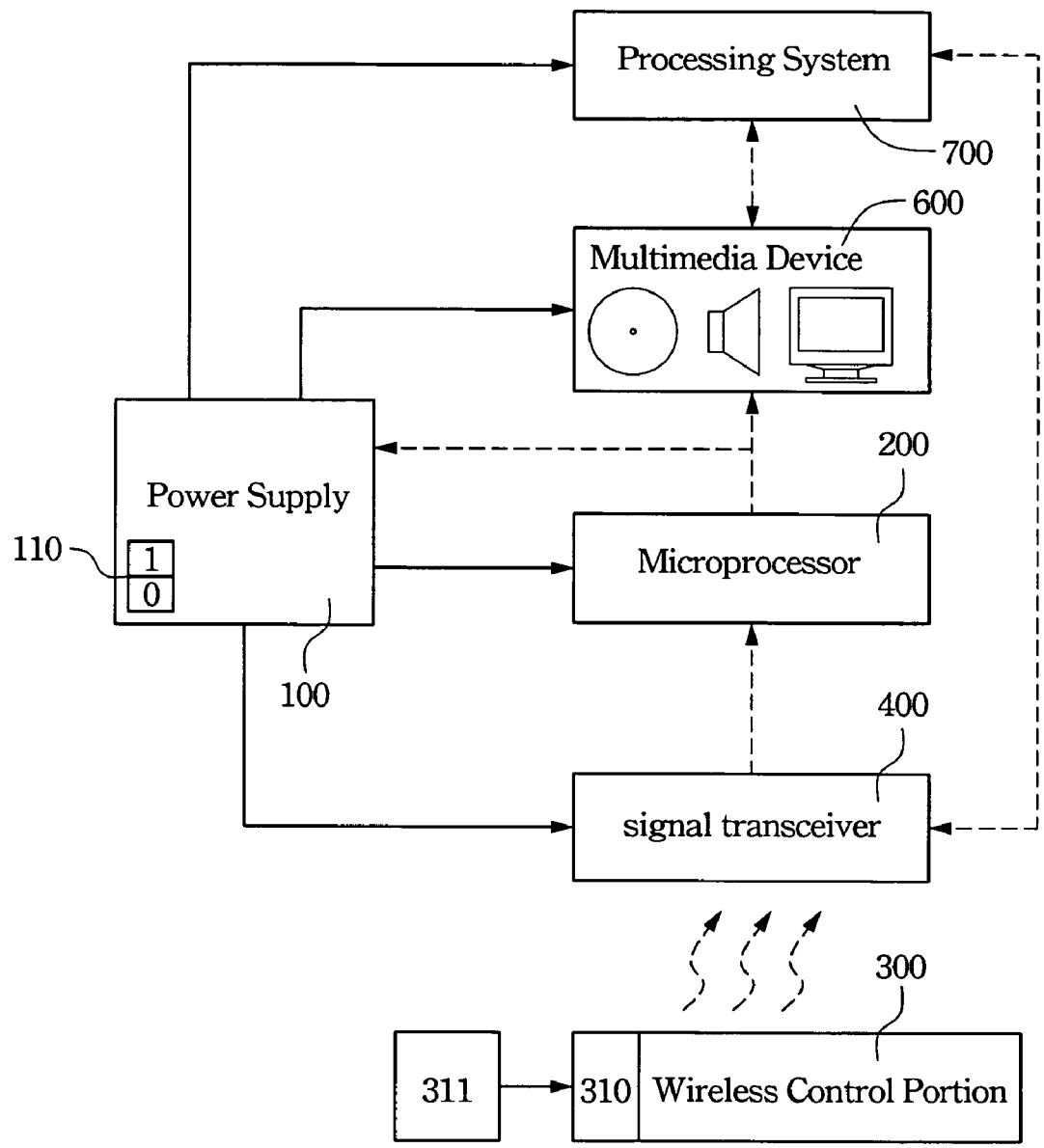
FIG. 2 is a system block diagram for another embodiment of the invention.

As shown in FIG. 2, in another embodiment of the invention the wireless control system further contains a multimedia device 600. The multimedia device 600 includes a channel selector, a media recording/playing device, a monitoring device, etc. The power supply 100 supplies the power to the multimedia device 600 via an independent wire. The multimedia device 600 is coupled to the microprocessor 200. The signal transceiver 400 receives the input signal of the wireless control portion 300 and transmits the corresponding signal to the microprocessor 200. The microprocessor 200 identifies the different signals in order to control the multimedia device 600. The multimedia device 600 can function without starting the processing system 700 and the associated application program. The multimedia device 600 is also coupled to the processing system 700 to transmit the data read by the multimedia device 600 to the processing system 700 for appropriate processing. Other than the above-mentioned circuit, the rest is the same as in the circuit of FIG. 1.

The on and off operations of the computer in the second embodiment are the same as in FIG. 1. Besides, without starting the processing system 700, the user manipulates the wireless control portion 300 to transmit a signal to the microprocessor 200 via the signal transceiver 400. Therefore, one can use the microprocessor 200 to operate the functions of the multimedia device 600.

Figure 3:
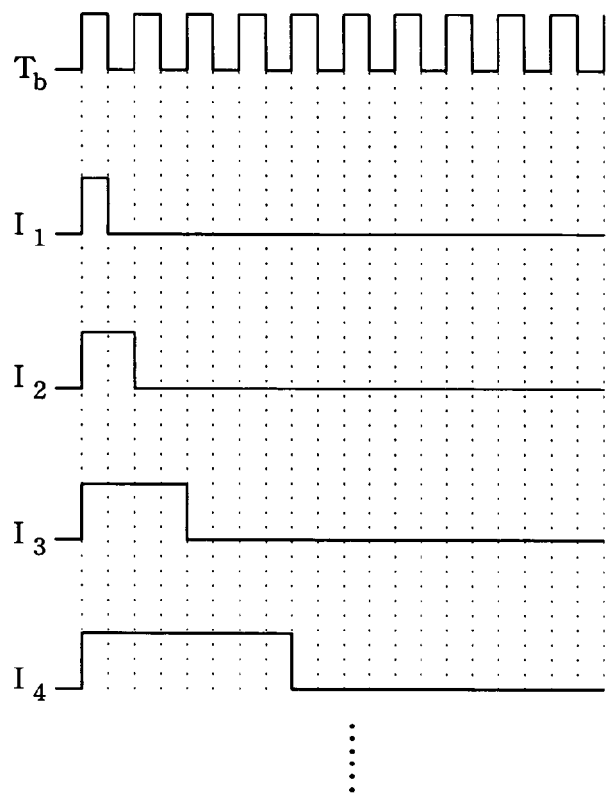
FIG. 3 is a time-ordered diagram of identifying signals by comparing pulse widths.
Figure 4:
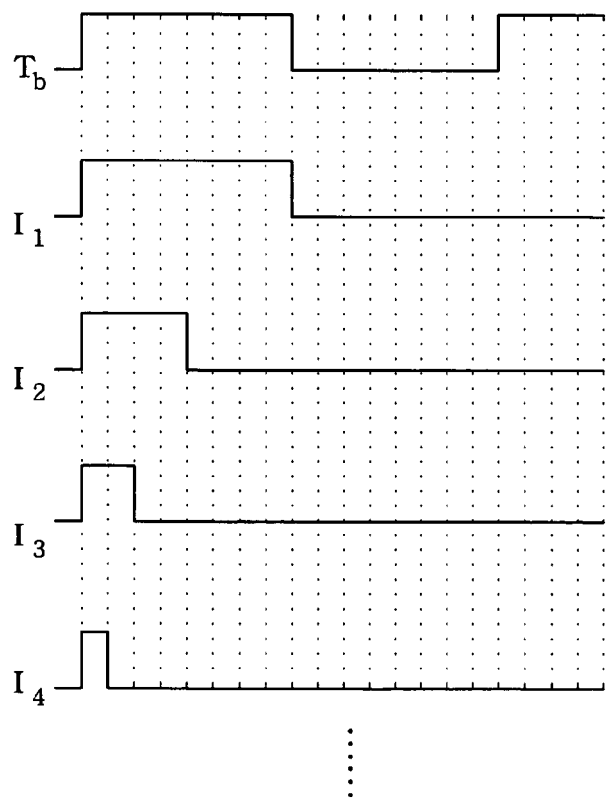
FIG. 4 is another time-ordered diagram of identifying signals by comparing pulse widths.

The method of identifying the signals of different operation keys on the wireless control portion 300 is illustrated in FIG. 3. The operation keys have different functions. Different signals are transmitted out of the wireless control portion 300 when one operates the different operation keys. The signal transceiver 400 receives the signals from the wireless control portion 300 and decodes them into pulse signals I1, I2, I3, I4 . . . of different widths. The decoded pulse signals are transmitted to the microprocessor 200. The pulse signals of the operation keys are compared with respect to a base time-ordered pulse Tb with a fixed frequency inside the computer. For example, the pulse width of I1 is the same as the width between a high and a low of Tb. The pulse width of I2 is twice the width between a high and a low of Tb. The pulse width of I3 is four times the width between a high and a low of Tb. The pulse width of I4 is eight times the width between a high and a low of Tb. Alternatively, as shown in FIG. 4, the operations keys on the wireless control portion 300 generate different pulse signals I1, I2, I3, I4, etc. They are compared with a base time-order pulse Tb. For example, the pulse width of I1 is the same as the width between a high and a low of Tb. The pulse width of I2 is ½ of the width between a high and a low of Tb. The pulse width of I3 is ¼ of the width between a high and a low of Tb. The pulse width of I4 is ⅛ of the width between a high and a low of Tb. That is, by comparing the pulse width relation between the pulse signals generated by the operation keys and the base time-ordered pulse, the microprocessor 200 can distinguish among the signals of different operation keys on the wireless control portion 300.

For illustration purposes, the above-mentioned different pulses widths are preset to be $2^n$ (n being an integer) times of the base time-order pulse. However, the applications of the invention are not limited by this, as long as the signals produced by the different operation keys can be readily identified. The signals of the operation keys and the base time-ordered pulse may contain various different pulse frequencies and widths. One may also use the combination of pulse frequencies and pulse widths to help identifying signals generated by the operation keys. The effect of each individual pulse signal can be set according to needs. For example, one can set I1 as Power On, I2 as Power Off, I3 as Restart DVD, I4 as Volume Up, etc.

In FIGS. 1 and 2, the power supply 100 provides power to each circuit block. If the circuit blocks other than the processing system 700 are designed to function in the same power supply environment, then the power supply 100 can be simplified as supplying two different power sources. One supplies power to the processing system 700, whereas the other supplies power to the circuits other than the processing system 700.

From the above embodiments of the invention, one should see that the invention has the following advantages:

1. Under the action of the power supply, the user can control the on and off of the processing system by simply manipulating the wireless control portion.

2. Even if the processing system is not turned on, the user can still use the wireless control portion to start functions of the multimedia device.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A wireless control system for a computer with a processing device, comprising:
    a power supply for converting external power into power needed by the computer;
    a microprocessor coupled to the power sup ply to control the power supply;
    a wireless control portion, including:
        a plurality of operation keys that generate different signals; and
        a power source for supplying working power to the wireless control portion;
    a signal transceiver coupled to both the microprocessor and the processing device to receive and decode the signal generated by the wireless control portion and to transmit the decoded signal to the microprocessor and the processing device; and
    a multimedia device coupled to the power supply and coupled to the microprocessor for transmitting an input signal of the wireless control portion to the multimedia device and controlling the multimedia device, and coupled to the processing device for transmitting data read by the multimedia device to the processing device;
    wherein when the wireless control portion sends out a signal for turning off the processing device and the multimedia device, the signal transceiver receives and decodes the signal and the microprocessor identifies the decoded signal to make the power supply stop supplying power to the processing device and the multimedia device; when the wireless control portion sends out a signal for restarting the processing device, the signal transceiver receives and decodes the signal and the microprocessor identifies the decoded signal to make the power supply start supplying power to the processing device and the multimedia device, and the multimedia device transmits data read by the multimedia device to the processing device.

2. The wireless control system of claim 1, wherein the power supply contains a main switch to control the on and off of the external power.

3. The wireless control system of claim 1, wherein the wireless control portion includes a wireless keyboard, a wireless mouse, and a wireless drawing board.

4. The wireless control system of claim 1, wherein the signals between the wireless control portion and the signal transceiver include the electromagnetic (EM) signal, the infrared (IR) signal, and the ultrasonic signal.

5. The wireless control system of claim 1, wherein the power source of the wireless control portion includes a reusable power source.

6. The wireless control system of claim 5, wherein the wireless control portion contains a charger to charge the reusable power source or to be the power supply for the wireless control portion.

7. The wireless control system of claim 1, wherein the multimedia device includes a channel selector, a media recording/playing device, or a monitoring device.

8. The wireless control system of claim 1, wherein the power supply contains two different power sources, one supplying power to the processing device and the other supplying power to circuits other than the processing device.

9. A wireless control method for a computer, comprising the steps of:
    sending out a control signal from a wireless control portion;
    receiving and decoding the control signal into a pulse signal by a signal transceiver;
    identifying the pulse signal by a microprocessor and sending signals to a power supply and a multimedia device;
    switching a power supplying state for a processing device and a power supply state for the multimedia device by the power supply according to the identification pulse signal; and
    transmitting data read by the multimedia device to the processing device according to the identified pulse signal.

10. The method of claim 9, wherein the power supply stops supplying power to the processing device when the control signal is to shut down the processing device.

11. The method of claim 9, wherein the power supply starts supplying power to the processing device when the control signal is to turn on the processing device.

12. The method of claim 9 further comprising the step of supplying an external power to the power supply.

* * * * *